J. M. PERLMAN.
VEHICLE BODY.
APPLICATION FILED FEB. 28, 1919.

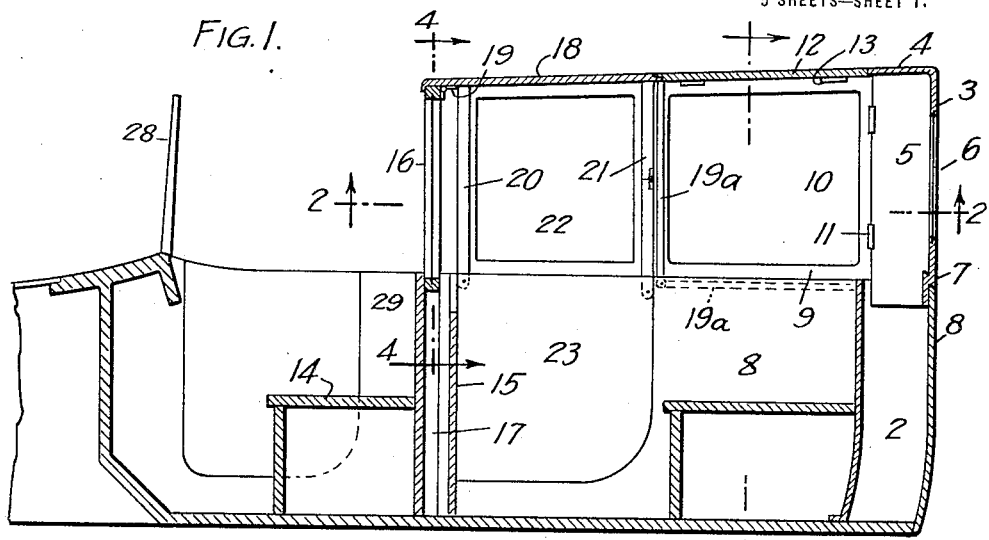
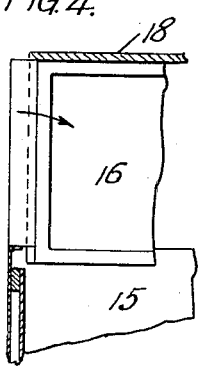
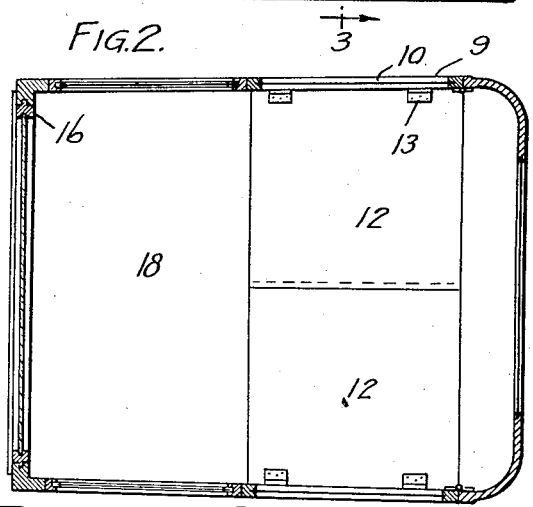
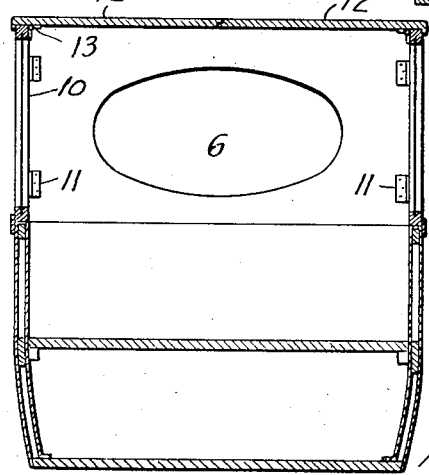
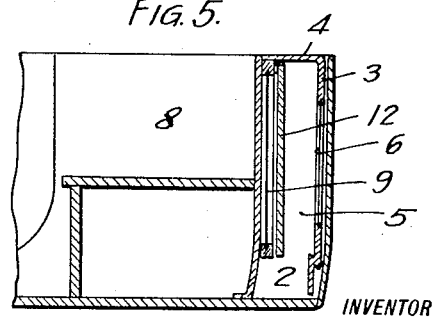

1,328,391.

Patented Jan. 20, 1920.
5 SHEETS—SHEET 2.

INVENTOR
Jacques M. Perlman
BY
ATTORNEY

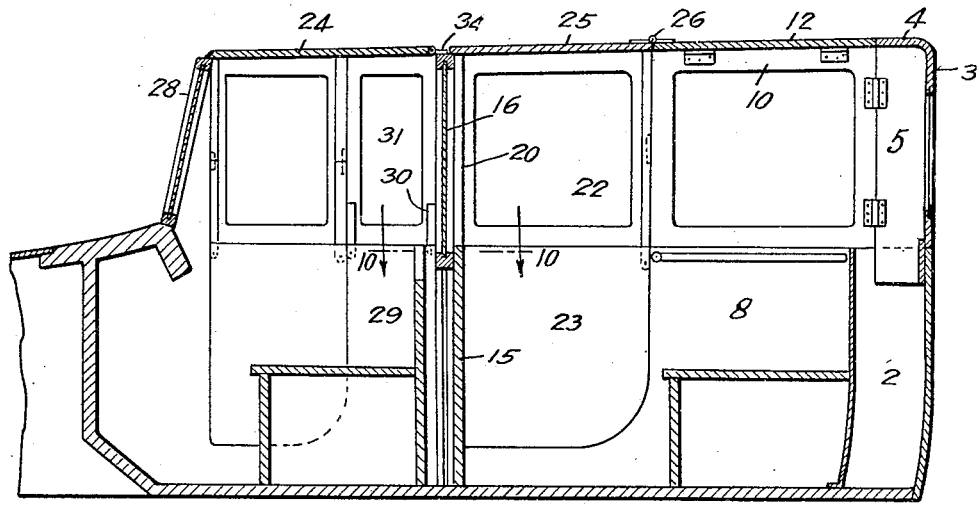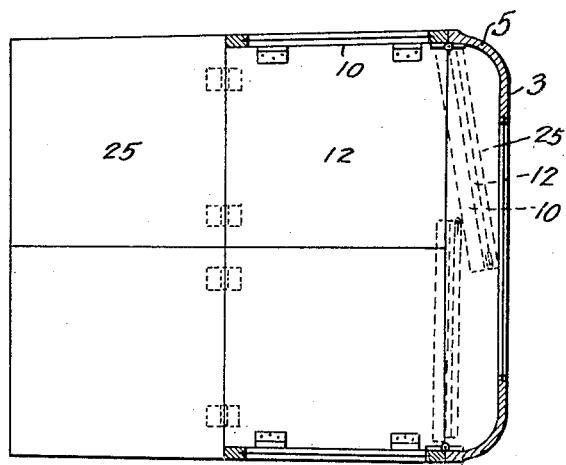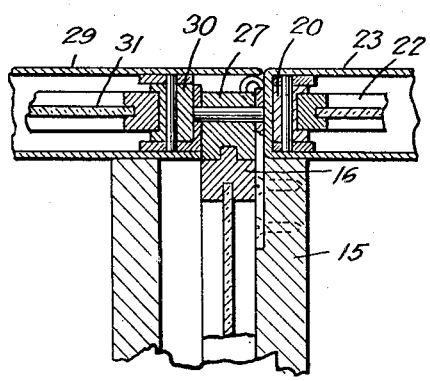

J. M. PERLMAN.
VEHICLE BODY.
APPLICATION FILED FEB. 28, 1919.

1,328,391. Patented Jan. 20, 1920.
5 SHEETS—SHEET 4.

INVENTOR
Jacques M. Perlman
BY
ATTORNEY

J. M. PERLMAN.
VEHICLE BODY.
APPLICATION FILED FEB. 28, 1919.
1,328,391.
Patented Jan. 20, 1920.
5 SHEETS—SHEET 5.
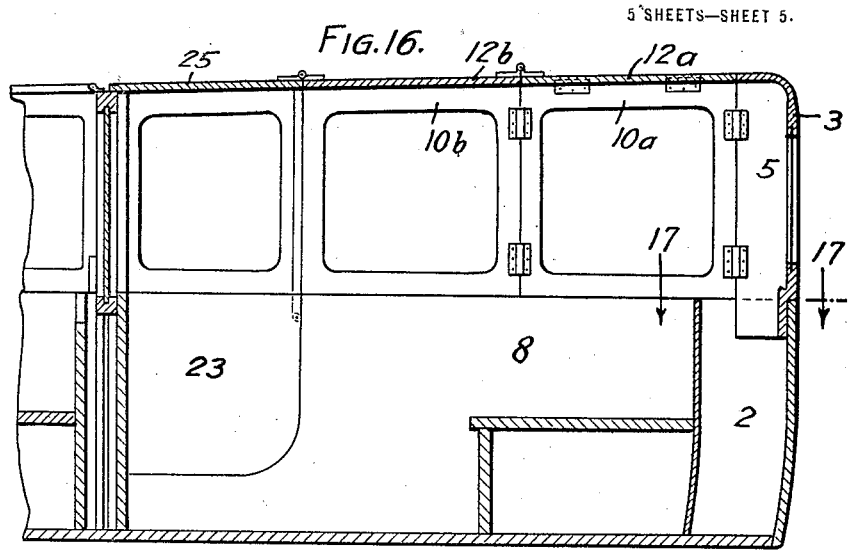
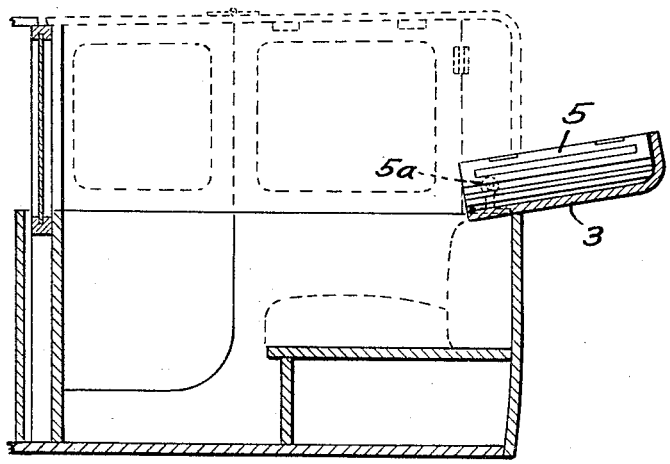
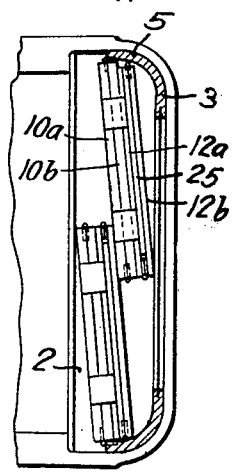
INVENTOR
Jacques M. Perlman
BY
D. Anthony Usina
ATTORNEY.

UNITED STATES PATENT OFFICE.

JACQUES M. PERLMAN, OF NEW YORK, N. Y.

VEHICLE-BODY.

1,328,391.   Specification of Letters Patent.   Patented Jan. 20, 1920.

Application filed February 28, 1919. Serial No. 279,680.

*To all whom it may concern:*

Be it known that I, JACQUES M. PERLMAN, a citizen of the United States, and residing in the city, county, and State of New York, have invented certain new and useful Improvements in Vehicle-Bodies, of which the following is a specification.

My invention aims to provide a body for automobiles and similar vehicles which can be used with the top and sides open like the ordinary touring car or which can be closed over certain parts to convert it into a limousine or landaulet or other more or less closed type as hereinafter described more fully.

The accompanying drawings illustrate an embodiment of the invention.

Figure 1 is a longitudinal section showing the invention applied to convert a car into a limousine with the driver's seat uncovered, or what is sometimes called a demilimousine or brougham;

Figs. 2 and 3 are sections on the correspondingly numbered lines in Fig. 1;

Fig. 4 is a partial section on the line 4—4 of Fig. 1;

Fig. 5 is a longitudinal section through the rear end of the body with the adjustable top and side members lowered to convert the car into an ordinary touring type;

Figs. 6 to 9 illustrate a modification, of which Fig. 6 is a side elevation of the car converted into a landaulet;

Figs. 7 and 8 are longitudinal sections showing it respectively as a sedan and as a full closed limousine;

Fig. 9 is an underside plan view of the adjustable parts of Fig. 8 at the rear of the transverse partition;

Fig. 10 is a horizontal section on the line 10—10 of Fig. 8;

Fig. 16 is a section similar to Fig. 8, illustrating a modification;

Fig. 17 is a section on the line 17—17 of Fig. 16 of the rear part of the construction shown;

Fig. 18 is a longitudinal section of another modification.

Figure 6:
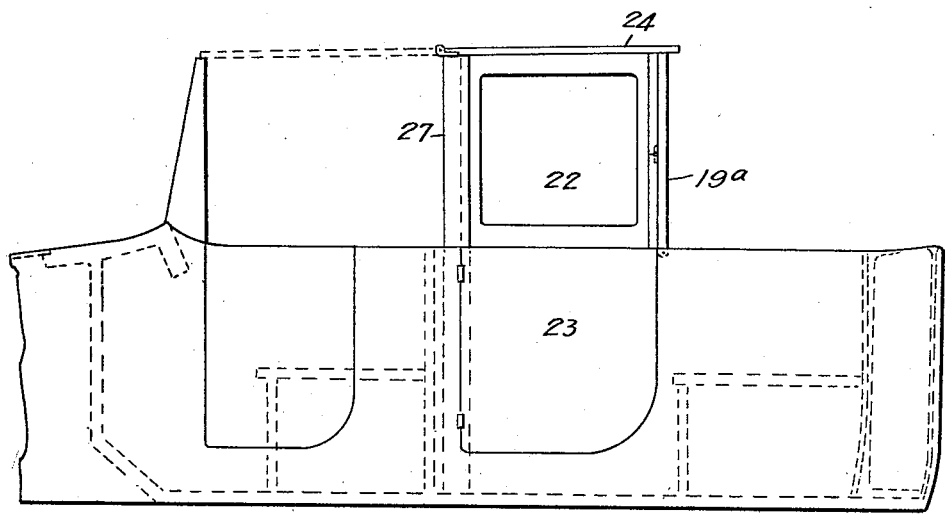

Referring to the embodiment of the invention illustrated, the fixed portion is of the usual type with the addition of a pocket 2 beyond the rear seat. A back extension 3 is provided with a top flange 4 and side flanges 5 and preferably with a window 6, the whole adapted to be lowered into the pocket 2 as indicated in Fig. 5, or to be elevated as in Fig. 1 and to be supported by a shoulder 7 on the rear fixed portion 8 of the body.

Side extensions 9, preferably also provided with windows 10, are connected by hinges 11 along their rear edges with the forward edges of the flanges 5 and are arranged when the back extension is elevated to swing out over the sides 12 of the rear portion of the body and to rest thereon so as to form upward extensions of the same, as in Fig. 1. Or the side extensions 9 may be swung back toward the face of the rear extension 3 and within the space between the flanges 5, so as to be lowered with the rear extension into the pocket 2 as indicated in Fig. 5.

The top for covering the space between the side extensions 9 comprises two parts 12 fastened at their outer edges by hinges 13 to the upper edges of the side extensions 9. When the latter are in use, as in Fig. 1, the parts 12 of the top are swung up, meeting each other along an approximately central longitudinal line as shown in the underside view, Fig. 2, and joining along their rear edges with the edge of the top flange 4 of the rear extension. Or the parts 12 may be swung down, each against the face of its side extension 9 and then swung backward with the latter toward the rear extension and dropped with such parts into the rear pocket as indicated in Fig. 5. To the rear of the driver's seat 14 is a transverse partition 15 which is hollow and carries an extension 16 that can be raised or lowered into the pocket 17 of said partition. On the upper edge of the extension 16 is a top member 18 fastened by a hinge 19 so that when the extension is elevated the member 18 may be swung up to constitute the forward part of a top which is a continuation of the rear parts 12. The rear edge of the top member 18 will be supported by posts 19ᵃ hinged at their forward ends on the fixed sides 12 of the body so that they may be elevated to the position shown in full lines in Fig. 1, or may be lowered out of the way as in the dotted line position. Guides 20 and 21 and the windows 22 which are carried by the rear door 23 and which may be of any usual or suitable construction, will be elevated closing the entire sides of the rear or passenger compartment of the car. The top member 18 is supported by the posts 19ª, so that the doors with their elevated windows 22 may be opened or closed. The top 18 has its rear edge fitting under the meeting edges of the members 12 so as to support the latter end; if desired any fastening means may be used at the meeting edges of the several parts.

When the car is to be used as a landaulet, the back extension, carrying the side extensions 9 and the top members 12 is let down in the rear pocket and only the transverse extension 16 and top 18 are elevated, the latter being supported by the elevated posts 19ª.

In connection with the design shown in Fig. 1 a separate top can be provided to cover the driver's compartment, such for example as the spring roller top shown in my pending application No. 272,430. This forward top member can be used with the rear members arranged in any of the ways above described.

Figure 7:
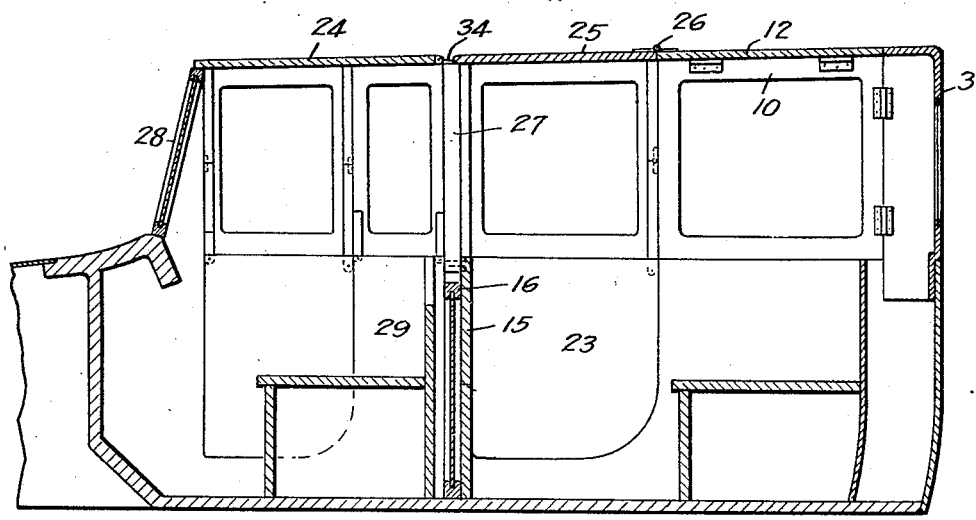
Figure 11:
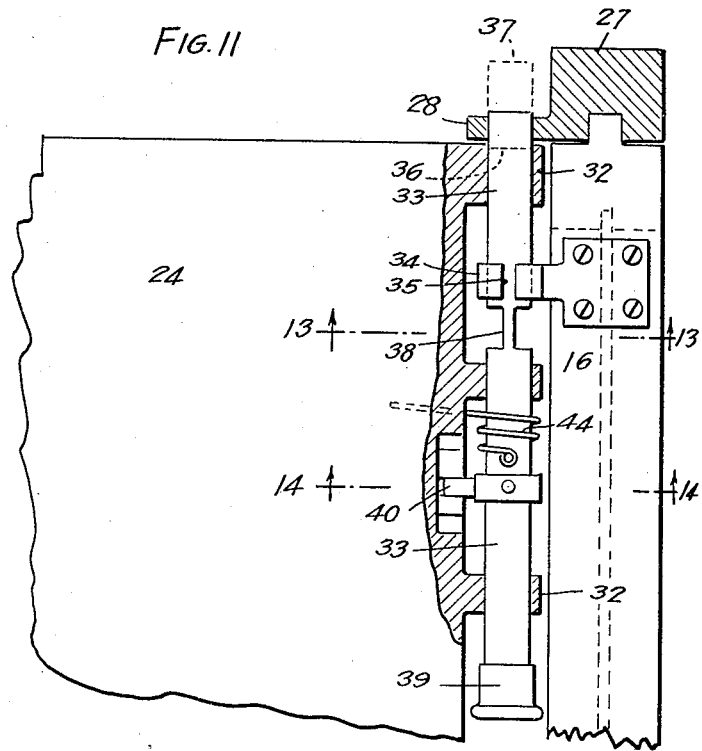
Fig. 11 is a plan partly in section of the hinge arrangement of the front cover.
Figure 12:
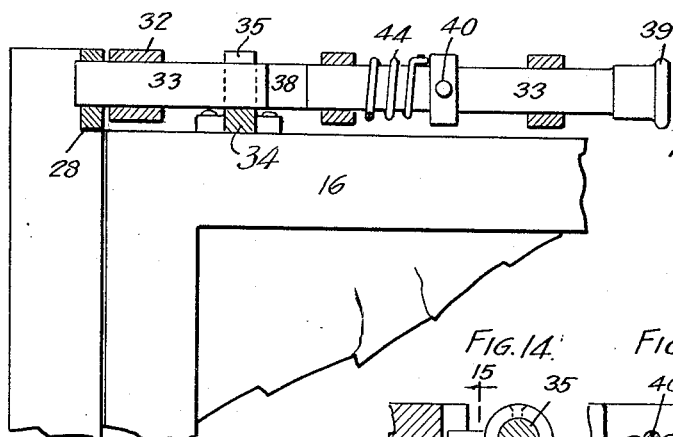
Fig. 12 is a side elevation of the same.
Figure 13:
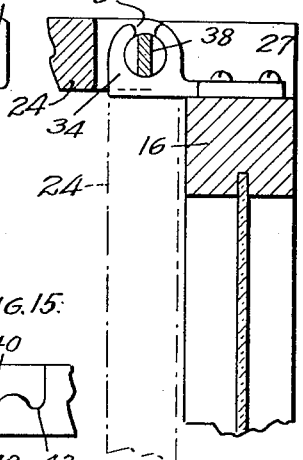
Fig. 13 is a section on the line 13—13 of Fig. 11.
Figure 14:
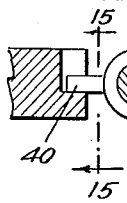
Fig. 14 is a section on the line 14—14 of Fig. 11.
Figure 15:
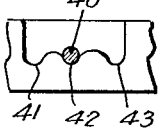
Fig. 15 is a section on the line 15—15 of Fig. 14.

Preferably however I provide in connection with the transverse partition 16 a forward top member 24 as illustrated in Figs. 6, 7 and 8, which can be swung either to the rear as in Fig. 6 or to the front as in Figs. 7 and 8; and I provide additional top members 25 which when the rear extension and the rear top members 12 are set up can be swung forward on hinges 26 to cover the space between the member 12 and the transverse partition. Fig. 9 shows the relation of these parts in underside plan view. When the top is to be lowered the parts 25 are first swung back onto the parts 12, then these two parts are swung down against the inner face of the side extension 9, and the three parts thus laid flat against each other are swung in against the back extension to the position shown in dotted lines in Fig. 9; after which the back extension with the several connected parts can be lowered as above explained into the pocket 2.

When the car is to be used as a landaulet, the back extension and connected parts are lowered, the transverse partition 16 is raised and the top member 24 is swung back and supported on the elevated posts 19ª, the window 22 in the door 23 being usually elevated as shown in Fig. 6.

When the car is to be used as a sedan the back extension and connected parts are put up as in Fig. 7 and the front top member 24 is set up in its forward position, resting on the side guides 27 which normally swing down and cover the pocket in the transverse partition 15 with the extension 16 therein. The details of this construction are more fully described below. The extension 16 is left down in the pocket of the partition 15 so that the driver's and passenger's compartments are in open communication with each other. To secure a limousine the transverse extension 16 is elevated as in Fig. 8 and the front top member 24 set up extending therefrom to the wind shield 28. The rest of the car is arranged as for a sedan, the difference being in the cutting off of the driver's space from that of the passengers.

For using this construction to secure a brougham or town car, we may start with the parts as in Fig. 8 and drop the side windows of the forward compartment in the usual way, either leaving the top member 24 in place or swinging it down against the transverse extension 16.

For use as an ordinary touring car, the back extension and transverse extension and their connected parts and the rear side windows may be lowered out of sight. The various adjustable members may be provided with windows in any desired arrangement, with electric lights, pockets and other usual or suitable accessories. The side members 10 may be made each in two leaves hinged together along a vertical line, this construction being especially useful for extra long bodies where the distance back of the door 23 is very elongated, especially where its length is so great that a single side member which is to cover it could not be accommodated within the width of the back extension 3. The same construction may be used for the several top members. Such a construction is illustrated in Figs. 16 and 17. The rear portion 8 of the car is so long that it is covered at the sides by two members 10ª and 10ᵇ hinged together as illustrated. The top of this portion of the body is likewise made in two leaves 12ª and 12ᵇ hinged to each other; the rear leaf 12ª being hinged to the side member 10ª. The construction is repeated at the two opposite sides of the car. The leaf 25 is folded back on to the leaf 12ᵇ and these two then folded back on the leaf 12ª. The member 10ᵇ is swung back against the member 10ª and the assembled leaves of the top are swung down after which they are all swung back into the back extension 3 as shown in Fig. 19.

Fig. 10 shows in detail the construction at one end of the transverse partition 15. In the casing of the rear door 23 is a transversely pivoted guide 20 for the window 22 to slide up and down. In the forward part 29 of the body is a similar transversely pivoted guide 30 for a sliding window 31. On a longitudinal pivot extending between the aforesaid parts is carried a guide 27 for the transverse window or extension 16 which moves up and down in the transverse partition 15.

The mounting of the front top member 24 is shown in Figs. 11 to 15. This member is provided with ears 32 in which slides a pivot bolt 33 which ordinarily passes through a bearing member 34 mounted on the top of the transverse extension 16 and formed with a slot 35 at the top. The side guide 27 is also provided with an ear 28 adapted to form a bearing for the end of the bolt 33. In the position of the parts illustrated the top 24 is pivotally connected with both the guide 27 and the transverse extension 16. If the bolt 33 be pulled inward so that its end comes to the point indicated at 36 the top member will be connected only to the transverse extension 16. If however the bolt be pushed outward to the point indicated at 37 then the reduced portion 38 of the bolt will come in line with the opening 35 in the bearing member 34 and this will permit the side extension 16 to be dropped, leaving the top member pivotally fastened to only the side guide 27.

The bolt 33 has a handle 39 by which it can be turned and shifted longitudinally. It carries also a collar fastened thereon with a set screw and having a lateral projection 40 adapted to fit in any one of three notches 41, 42 and 43 in the adjacent edge of the top member 24. A torsion spring 44 tends to press the projection 40 into said notches and thus to prevent accidental shifting of the bolt longitudinally.

When the parts are all lowered the bolt 33 is withdrawn to its extreme inward position. When the limousine of Fig. 8 is to be produced, the side guides 27 are swung up and the transverse extension 16 slid up sufficiently to permit the top member 24 to swing forward. The member 16 being then held in a position somewhat below its highest elevation, the member 24 can swing up until its forward edge passes the top of the wind shield 28. The member 16 will then be completely elevated and the top member 24 dropped with its edge on the wind shield. In this position the bolt will register with the opening in the ear 28 of the guide 27 (it being understood that this construction is repeated at the opposite side of the car) and the bolt will be pushed by hand to the intermediate position, Fig. 11, where the parts will all be held together and the top will be free to pivot.

If the landaulet form is desired the top 24 will be swung back as in Fig. 6, bringing up posts 19ª to support it.

If the sedan form of Fig. 7 is desired, then the extension 16 must be dropped after the parts have been elevated as above described. For this purpose, starting from the position of Fig. 11, the operator will push the bolt to its extreme outward position and will then lower the extension 16, the part 38 of the bolt passing through the slot in the top of the ear 34 as above described. The top will be left supported by the side guides 27.

Before lowering the top 24 it must be again brought into engagement with the extension 16 and the bolt withdrawn to the position indicated at 36 so that the top 24 can swing down against the extension 16 and allow the lowering of the latter and the subsequent swinging down of the guides 27.

With the top member 24 up and supported by the side guides 27 alone, and with the rear extension and parts connected thereto all set up we can lower the several door windows and have a car like the ordinary touring car with a top for protection from the sun, and with the added protection of the side members 10 and 31 to shield the passengers from the wind.

I have, therefore, practically a universal convertible body providing all the usual styles of partial or complete protection against rain and wind and sun and some styles which are different from any now found in practice. By a comparatively simple and easily operated construction the car can be adapted to all seasons and all weathers and can be changed according to the fancy of the owner.

The several extensions and top members described can be readily added to an old body, or they can be sold with or without a new car according to the desire of the purchaser. Instead of dropping back into a pocket 2 the rear extension and the parts attached thereto can be made to swing back like the ordinary collapsible top and be inclosed in an envelop or similar cover to make a neat appearance and to protect them from the weather. For example, in Fig 18 the back extension 3 has its side flanges 5 hinged near their lower ends to lugs 5ª extended up from the sides of the car body so that it may be swung back in the manner illustrated in full lines or may be elevated to inclose the car as shown in dotted lines.

Though I have described with great particularity in detail certain specific embodiments of my invention, yet it is not to be understood therefrom that the invention is restricted to the particular embodiments disclosed. Various modifications in detail and in the arrangement of the parts may be made by those skilled in the art without departure from the invention as defined in the following claims.

What I claim is:

1. A vehicle body provided with means for converting it into different styles comprising a back extension adapted to be lowered or elevated, side extensions hinged along their rear edges to said back extension so that they may be swung back toward the face of the latter or, when it is raised, may be swung forward over the fixed sides of the vehicle and a top for covering the space between said side extensions, said top comprising two parts one hinged to each side extension and adapted to be swung down against the face of its side extension and to be swung with its side extension back against the face of the back extension.

2. A vehicle body provided with means for converting it into different styles comprising a back extension adapted to be lowered or elevated, side extensions hinged along their rear edges to said back extension so that they may be swung back toward the face of the latter or, when it is raised, may be swung forward over the fixed sides of the vehicle, said back extension having a forward flange at its upper edge forming part of a top over the car and having forward side flanges to the edges of which said side extensions are hinged and between which said side extensions are located when they are swung back.

3. A vehicle body provided with means for converting it into different styles comprising a back extension adapted to be lowered or elevated, side extensions hinged along their rear edges to said back extension so that they may be swung back toward the face of the latter or, when it is raised, may be swung forward over the fixed sides of the vehicle and a top for covering the space between said side extensions, said top comprising two parts, one hinged to each side extension in combination with a partition extension adapted to be elevated at the rear of the driver's seat and a top member adapted to extend between said partition extension and the first mentioned top.

4. A vehicle body provided with means for converting it into different styles including a transverse extension adapted to be elevated at the rear of the driver's seat and a top member carried thereby and adapted to be extended therefrom forward over the driver's seat or rearward over the rear compartment.

5. A vehicle body provided with means for converting it into different styles including a transverse extension adapted to be elevated at the rear of the driver's seat, side guides arranged to swing down over said extension in its lowered position, or to be elevated at the sides thereof in its raised position, and a top member adapted to be attached to the upper ends of said side guides and to the upper edge of said extension.

6. A vehicle body provided with means for converting it into different styles including a transverse extension adapted to be elevated at the rear of the driver's seat, side guides arranged to swing down over said extension in its lowered position, or to be elevated at the sides thereof in its raised position, and a top member adapted to be attached to the upper ends of said side guides and to the upper edge of said extension, and to swing either forward or rearward of its point of attachment.

7. A vehicle body provided with means for converting it into different styles including a transverse extension adapted to be elevated at the rear of the driver's seat and a top member carried thereby and adapted to be extended therefrom forward over the driver's seat or rearward over the rear compartment, in combination with a back extension and top adapted to be raised and lowered.

8. A vehicle body provided with means for converting it into different styles including a transverse extension adapted to be elevated at the rear of the driver's seat and a top member carried thereby and adapted to be extended therefrom forward over the driver's seat or rearward over the rear compartment, in combination with a back extension and top adapted to be raised and lowered, said top extending from the back extension to said transverse extension.

In witness whereof I have hereunto signed my name.

JACQUES M. PERLMAN.